US008097310B2

(12) United States Patent
Miller et al.

(10) Patent No.: US 8,097,310 B2
(45) Date of Patent: Jan. 17, 2012

(54) FIRESTOP ARTICLE WITH ATTACHMENT SURFACE

(75) Inventors: Stephen A. Miller, St. Paul, MN (US); Charles W. Stobbie, IV, Woodbury, MN (US); Lauren N. Waxer, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 1432 days.

(21) Appl. No.: 10/360,087

(22) Filed: Feb. 7, 2003

(65) Prior Publication Data

US 2004/0157012 A1 Aug. 12, 2004

(51) Int. Cl.
*B32B 33/00* (2006.01)
*B32B 3/06* (2006.01)
*B32B 1/00* (2006.01)
*E04B 1/94* (2006.01)

(52) U.S. Cl. .......... 428/34.1; 428/35.7; 428/88; 428/99; 428/100; 52/317

(58) Field of Classification Search ................. 428/34.1, 428/35.7, 85, 88, 91–97, 99, 100, 192; 52/317, 52/232
See application file for complete search history.

(56) References Cited

U.S. PATENT DOCUMENTS

| | | | | |
|---|---|---|---|---|
| 4,232,493 | A | 11/1980 | Gray et al. | |
| RE31,428 | E | 10/1983 | Pedlow | |
| 4,477,694 | A | 10/1984 | Kohaut | |
| RE32,131 | E | 4/1986 | Stahl | |
| 4,584,214 | A | 4/1986 | Eiermann | |
| 5,225,622 | A | 7/1993 | Gettle et al. | |
| 5,394,786 | A | 3/1995 | Gettle et al. | |
| 5,848,926 | A * | 12/1998 | Jardetzky et al. | 446/85 |
| 5,887,395 | A * | 3/1999 | Navarro et al. | 52/232 |
| 5,887,396 | A * | 3/1999 | Thoreson | 52/232 |
| 5,888,335 | A * | 3/1999 | Kobe et al. | 156/306.3 |
| 5,984,247 | A * | 11/1999 | Luhmann et al. | 248/205.3 |
| 6,182,407 | B1 * | 2/2001 | Turpin et al. | 52/232 |
| 6,820,382 | B1 | 11/2004 | Chambers | |
| 2002/0090265 | A1 | 7/2002 | Merten | |
| 2002/0100404 | A1 | 8/2002 | Gottfried | |

FOREIGN PATENT DOCUMENTS

| | | |
|---|---|---|
| EP | 1 281 418 | 2/2003 |
| JP | 50-139583 | 11/1975 |
| JP | 57-145442 | 9/1982 |
| JP | 6-141941 | 5/1994 |
| JP | 08-299487 | 11/1996 |
| JP | 10-114357 | 5/1998 |
| WO | WO 94/20055 | 9/1994 |
| WO | WO 02/36207 A1 | 5/2002 |
| WO | WO 03/014260 A1 | 2/2003 |

* cited by examiner

*Primary Examiner* — Walter B Aughenbaugh
(74) *Attorney, Agent, or Firm* — Kenneth B. Wood

(57) ABSTRACT

A firestop article for fire stopping an opening in a floor or wall includes a firestop material, an enclosure surrounding the firestop material, and an attachment surface provided on the outer surface of the enclosure that allows the article to be repeatably connected to and removed from a mating surface.

7 Claims, 2 Drawing Sheets

FIRESTOP ARTICLE WITH ATTACHMENT SURFACE

FIELD OF THE INVENTION

The present invention relates generally to fire stopping articles for fire stopping openings in walls, floors and ceilings and, more particularly, to a firestop article including a pouch filled with an intumescent material which serves to form a fire barrier in the opening in the event of a fire.

BACKGROUND OF THE INVENTION

One mechanism by which fire and smoke may spread from one compartment of a structure to another is through passages or openings, often referred to as through-penetrations, in the walls, floors and ceiling. Such openings include, for example, cable access holes through which signal and power transmission cables pass.

Current methods used to prevent the spread of fire and passage of smoke through such openings include cutting two intumescent sheets to follow the contour of the penetrating cables, attaching them to each outer surface of the opening, and providing a bead of moldable intumescent putty along the perimeter of each sheet. While this technique is generally satisfactory for resisting the spread of fire and preventing the passage of smoke from one compartment to another, installation is labor intensive and time consuming. In addition, firestops fabricated in this manner do not lend themselves to repeated re-entry.

In addition, various bag-like devices, often referred to as pillows or bricks, are commercially available for fire stopping through-penetrations in wall and floor applications. Pillows are typically enclosed with polymeric film conforming to the shape of the filler material. Bricks typically comprise polyurethane foam with no additional film wrapping. These devices are secured in the opening by either a compression fit or friction between devices under slight compression. Compression fit requires the outer surfaces of the device to have low friction so devices can be slid past each other and easily positioned during installation. In wall applications, compression fit works well because gravity has little effect. In floor openings, however, sliding surfaces, which facilitate the installation process, are prone to sagging of the assembled firestop in all but the smallest openings. In addition, if one or more devices are removed from an opening to perform maintenance or to add or remove items from the opening, the remaining devices can more easily fall through the opening because the compressive force is relieved. Such installations must also be completely removed and replaced when cables or other items need to be added to or removed from an opening. In addition, floor applications often require a secondary reinforcement structure, such as a platform, grate or rack, to support the intumescent material in the opening and thereby prevent the bag-like device from falling through the opening. Such support structures, while accomplishing the desired function, add considerably to the time and expense of fire stopping the opening, and hinder re-entry of the opening.

Accordingly, there exists a need in the industry for a firestop article for fire stopping through-penetrations in floors and ceilings that is inexpensive, easy to install, allows the opening to be readily re-entered, and can effectively firestop openings in walls, floors, and ceilings without the need for a secondary support structure.

SUMMARY OF THE INVENTION

The present invention provides a firestop article useful for fire stopping an opening in a wall, floor, or ceiling. The firestop article includes firestop material and an attachment surface arranged to allow the article to be repeatably attached to, removed from, and reattached to an associated mating surface. The mating surface may be the attachment surface of an associated firestop article, the outer surface of the firestop associated article itself, or a surface defining the opening.

The attachment surface may be a refastenable mechanical fastener, a stretch release adhesive, a contact responsive fastener, or a repositionable adhesive. The mechanical fastener may be a hook-and-loop type fastener or a self-mating fastener. In one embodiment the attachment surface is a refastenable self-mating fastener including both hook and loop type fasteners.

In another embodiment, the firestop article includes an enclosure arranged around the firestop material. The enclosure may be formed of polymeric films such as polyethylene or polypropylene, woven materials, non-woven materials such as paper, spun-bond polypropylene or polyester, or flexible conformable fire resistant materials. In a specific embodiment, the enclosure itself is formed of a material having loop like characteristics that serve as the mating surface for hook like fastening elements.

The firestop material preferably includes an intumescent material and may also include a mixture of intumescent material, insulating material, and endothermic material. Alternately, the filler material may be a moldable intumescent putty.

In another embodiment, the firestop material includes an interior insulating material and an intumescent material arranged around at least a portion of the interior material. In one embodiment, the insulating material comprises mineral wool.

In a specific embodiment, the present invention provides a firestop article for fire stopping an opening in a floor or ceiling including firestop material having an interior insulating material and an intumescent material arranged around at least a portion of the interior material, an enclosure formed of a polymeric film surrounding the firestop material, and a refastenable self-mating attachment surface including both hook and loop type fasteners arranged to allow the article to be repeatably connected with a mating surface.

In another aspect, the present invention provides a method of fire stopping an opening in a floor or ceiling comprising the steps of providing a firestop article including firestop material, an enclosure surrounding the firestop material, and an attachment surface arranged on the enclosure to allow the article to be repeatably attached to a mating surface, and arranging a plurality of firestop articles in the opening with the attachment surface of one firestop article connected with the attachment surface of an adjacent firestop article.

BRIEF DESCRIPTION OF THE DRAWINGS

The present invention will be further described with reference to the accompanying drawings, in which.

DETAILED DESCRIPTION

Figure 1:
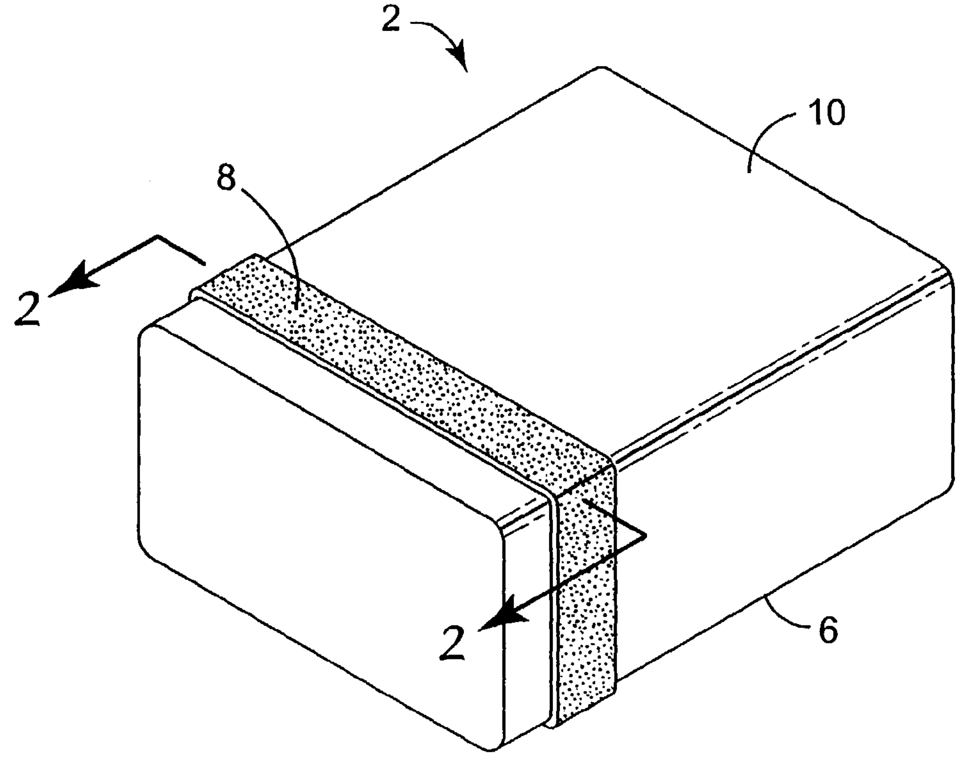
FIG. 1 is a perspective view of a firestop article in accordance with the invention.
Figure 2:
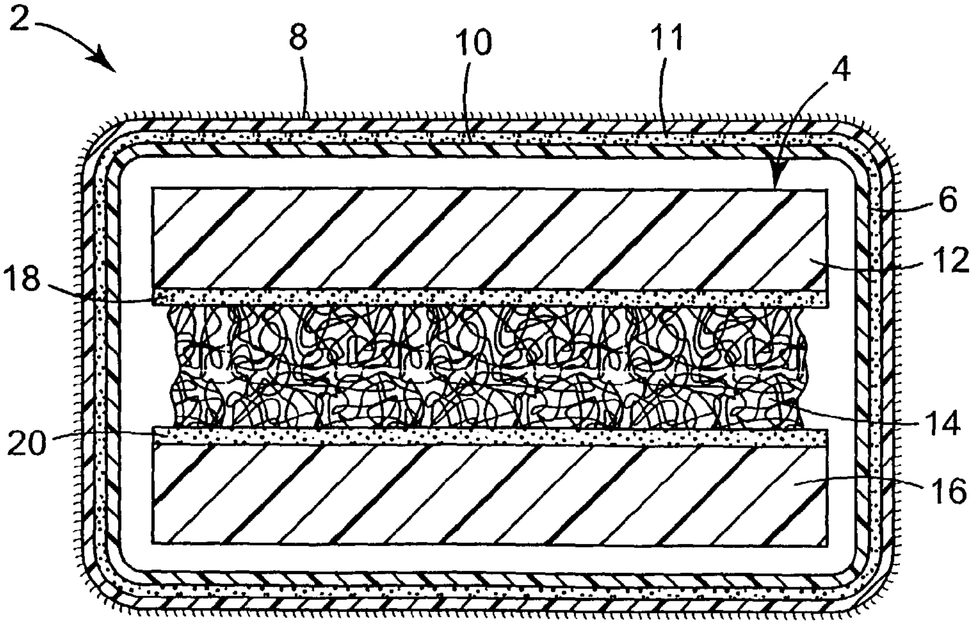
FIG. 2 is a cross-sectional view taken along line 2-2 of FIG. 1.

Referring now to FIGS. 1 and 2, there is shown a firestop article 2 including firestop material 4, an optional enclosure 6 surrounding the firestop material 4, and an attachment surface 8 provided on the outer surface 10 of the enclosure 6.

The enclosure 6 is preferably provided around the firestop material 4 to prevent or minimize the exposure of the installer to objectionable components of the firestop material 4. The enclosure 6 also facilitates handling and installation of the article 2. Because the enclosure 6 is not required, however, it will be recognized that the attachment surface 8 may be attached directly to the firestop material 4.

Suitable materials for the enclosure 6 include films such as polymeric films formed of polyethylene or polypropylene, woven materials, and non-woven materials such as spunbond polypropylene or polyester. A preferred enclosure 6 is a sealed bag formed of a suitable polymeric film material such as polyethylene film. Because the article 2 is often deployed adjacent concrete or cinder block that can damage the enclosure 6, the article 2 may be further provided with an additional reinforcing layer (not shown) adjacent the outer surface 10 the enclosure 6 to provide abrasion resistance and to otherwise prevent the article 2 from being damaged during the installation and removal process.

Prior to being exposed to fire-like conditions, the enclosure 6 serves to enclose the firestop material 4. During a fire or fire-like conditions, the firestop material 4, upon reaching its activation temperature, expands to close the opening and thereby prevent the passage of fire and smoke through the opening.

In accordance with a characterizing feature of the invention, the outer surface 10 of the article 2 includes an attachment surface 8 that allows the article 2 to be refastenably secured within an opening in a floor or ceiling, and refastenably affixed to other adjacent articles arranged in the opening. The attachment surface 8 is provided as a strip adjacent one end of the article 2 around the entire perimeter of the article. During installation, the outer surface 10 that does not include the attachment surface 8 is preferably inserted into the opening first so that the portion of the article 2 including the attachment surface 8 remains near the end of the opening and is therefore accessible to an installer who later wishes to separate the articles and remove one or more from the opening. It will be recognized, however, that the attachment surface may be provided on the entire outer surface 10 of the article 2 or any selected portion of the article and need not be limited to the end of the article. The article 2 may be installed manually by hand or with the aid of a tool such as a putty knife.

The attachment surface 8 depicted is intended to represent a variety of mechanical fasteners that are refastenable, i.e., once a fastening element has been connected with a mating surface, it can be pulled away without destroying its ability to connect again with the same mating surface or another mating surface. Examples of suitable refastenable fasteners include hook and loop fasteners and self-mating fasteners. Self-mating fasteners include a plurality of self-mating fastening elements, i.e., the fastening elements are capable of interlockingly engaging other fastening elements having an identical or substantially similar structure.

By providing the article 2 with a refastenable attachment surface, a plurality of articles 2 can be securely arranged in an opening in a wall, floor, or ceiling without the need for a secondary support structure to hold them in place, but individual articles can be readily and repeatably removed and replaced if items passing through the opening, such as wires or cables, need to be added or removed from the opening. This greatly facilitates re-entry of the opening. In addition, the refastenable attachment surface allows the articles 2 to be repeatably repositioned during installation.

It will be recognized that suitable fasteners may take on a variety of forms. One exemplary type of fastener includes conventional hook-and-loop fasteners such as those described in U.S. Pat. No. 2,717,437 (de Mestral) and U.S. Pat. No. 3,009,235 (de Mestral). Other suitable fasteners include the headed stem or mushroom-and-loop described in U.S. Pat. No. 4,846,815 (Scripps).

A preferred fastener is VELCRO OMNI-TAPE brand fastener available from Velcro USA, Inc., Manchester, N.H., which is a self-mating fastener including both hooks and loops intermingled on the same surface. Because this fastener is self-mating, it offers the advantage over conventional hook-and-loop fasteners that it can be attached to the same type of fastener on an adjacent device. In other words, it does not require a different cooperating surface to form an attachment. This allows the same fastener can be used on each device. Conventional hook-and-loop fasteners, in contrast, require the hook surface to be attached to a loop surface and vice versa, thereby requiring additional care on the part of the installer to form the attachment. The VELCOR OMNI-TAPE brand fastener also offers the advantage over many self-mating fasteners in that it readily attaches to itself and does not require a significant attachment force to form a secure attachment. This is particularly desirable with the present invention because the device is compressible and developing the force necessary to form a secure attachment can be difficult.

Another grouping of fasteners using a multiplicity of engaging elements are those that predominantly have solid protrusions including a stem and an expanded region or head at the stem tip. The expanded region or head can have a wide variety of shapes. Normally these fasteners are self-mating wherein the head portion is larger in diameter or cross section than is the space between heads. Exemplary patents describing this type of fastener include, for example, U.S. Pat. No. 2,499,898 (Anderson); U.S. Pat. No. 3,192,589 (Pearson); U.S. Pat. No. 3,266,113 (Flanagan, Jr.); U.S. Pat. No. 3,353,663 (Kayser et al.); U.S. Pat. No. 3,408,705 (Kayser et al.); and U.S. Pat. No. 5,097,570 (Gershenson).

U.S. Pat No. 3,899,805 (McMillan) teaches the use of headed hollow protrusions. This type of fastener includes an expanded region fitting into a seat above which is a reduced cross section or restricted pocket and/or by flexing of the stem. Joining of this type of fastener is normally associated with a single or double snap as the fastener is seated.

Another type of fastener having a multiplicity of intermeshing solid protrusions is described in U.S. Pat. No. 4,875,259 (Appeldorn). In this type of fastener, the tips of the protrusions are not expanded or headed. The bond is created by the frictional forces generated between contacting surfaces of the intermeshing protrusions where the surfaces are optically smooth flats. Additional examples of fasteners in this grouping can be found in U.S. Pat. No. 5,071,363 (Reylek et al.); U.S. Pat. No. 5,088,164 (Wilson et al.); U.S. Pat. No. 5,113,555 (Wilson et al.); and U.S. Pat. No. 5,201,101 (Rouser et al.) A fastener based on projections that perforate the web and alternate in rows from one side of the web to the other is disclosed in U.S. Pat. No. 4,581,792 (Spier). This fastener functions by engaging the projections in the receptacles to form a releasable friction fit.

In an alternate embodiment, the enclosure 6 itself is formed of a woven or non-woven material having "loop" characteristics that mate with conventional "hook" type fasteners that are provided on the attachment surface 8. In this manner, hook fasteners of the attachment surface 8 mate directly with the enclosure 6 and separate loop fasteners are not needed. This construction offers maximum flexibility in matching the mating surfaces together as the articles are inserted in the opening because the hook fasteners can mate with any exposed surface of the enclosure 6.

The attachment surface 8 is attached to the outer surface 10 of the enclosure 6 with adhesive 11. Other conventional means such as mechanical attachment including conventional sewing techniques using stitched thread may also be used.

Alternatively, the attachment surface 8 may comprise a non-tacky adhesive system including a contact responsive fastener layer, such as are disclosed and described in the published PCT application No. WO 96/24535 and the published PCT Application No. WO 94/21742. A contact responsive fastening layer is a non-tacky layer that has essentially no tack to paper, and allows multiple fastening and releasing cycles of the fastening layer with a target surface. The target surface preferably has a solubility parameter that permits the contact responsive fastening layer to have a selectable and consistently repeatable low 90° peel strength and high shear strength. Preferably, the contact responsive fastener layer can be reused against the target surface many times without noticeable transfer or migration of either material to the other. An advantageous feature of a contact responsive fastener layer is that it is cleanable, for example, with isopropanol or soap and water, in order to maintain/restore its fastening characteristics. A suitable commercially available contact responsive fastener is a contact adhesive available from 3M Company, St. Paul, Minn. under the trade designation FASTBOND 30 contact adhesive.

The firestop material 4 includes a first layer of intumescent material 12, an interior layer of insulating material 14, and a second layer of intumescent material 16. Adhesive layers 18, 20 are provided between the first intumescent layer 12 and the insulating material 14, and between the second intumescent layer 16 and the insulating material 14 to form a laminated composite structure. Suitable adhesives include pressure sensitive adhesives, hot melt adhesives, and the like. Alternatively, the intumescent layers 12, 16 may be extruded or coated directly onto the insulating layer without the aid of an adhesive.

The interior layer of insulating material 14 is preferably a non-woven fibrous material having a density of at least nominally 4 pounds per cubic foot, more typically at least nominally 6 pounds per cubic foot. Materials having a density of at least nominally 8 pounds per cubic foot may also be used. The insulating material is also preferably thermally stable up to a temperature of at least about 1600° F.

Suitable insulation materials include non-woven webs comprising man made vitreous fiber and optionally 5-10% by weight organic binder. Examples include fiberglass, mineral wool, refractory ceramic materials, and mixtures thereof. These materials are inexpensive and have good thermal insulation values that effectively reduce heat transfer across the installed firestop barrier. Selection of a particular insulation material will depend on a number of factors related to both the individual articles and the installed firestop system. Factors include the total quantity of fibrous insulation material in both the article and the finished system, material cost, health concerns, and ease of installation.

The total quantity of fiber is typically controlled by the density of the material, the compression of the fiber material during installation, and the ratio of fiber to unfiberized material. The non-woven fibrous web preferably contains a high ratio of fiber to unfiberized material which is also referred to as "shot". Materials that have less shot have higher insulation values. Suitable materials include man made vitreous fibers. A preferred insulation material is mineral wool due to both its low cost and minimal health concerns relative to other non-woven fibrous insulating materials. A more preferred non-woven fibrous insulating material is mineral wool made from basalt rock. Less preferred materials include those make from mixed oxides, also referred to as slag.

Since mineral wool typically sinters at temperatures experienced during a fire, there is a progress of the material from the unsintered to the sintered state between the hot and cold sides of the firestop barrier. Generally, as a material sinters, it becomes less effective as a firestop material. It is therefore preferred that at least a portion of the insulating material remain below approximately 1600° F. during exposure to conditions equivalent to those of ASTM E814, or conditions typically encountered in a fire or fire-like conditions. In addition, it is desirable that the average temperature of the firestop between the hot side and the cold side be less than about 1600° F. It is possible to minimize the temperature increase at the cold side of the firestop by maximizing the insulation value of the insulation material. Selection of webs with higher densities and/or a higher fiber to shot ratio increases the insulation value of the web.

In addition, sintering of the mineral wool is detrimental because of the significant shrink-age caused by sintering. This has the effect of decreasing the insulation value and the integrity of both the articles and the installed system. Also, shrinkage can result in voids forming between adjacent firestop articles that have been arranged in a through-penetration to form a fire barrier. These voids provide paths that allow heat, flames, and smoke to pass through the firestop barrier.

A preferred non-woven web material is 1260 BOARD MINERAL WOOL, available from Fibrex Insulation, Sarnia, Ontario. For applications where vitreous fibrous materials are objectionable, a suitable material is ULTRA DAM 4000 STRIPS available from 3M Company, St. Paul, Minn.

The layers of intumescent material 12, 16 preferably include an intumescent agent, a stabilizing agent, and a binder. In a preferred embodiment, the intumescent agent is substantially free of graphite. The intumescent material may include fillers and organic char forming components. A suitable intumescent material is described in the Welna U.S. Pat. No. 5,476,891. A suitable commercially available intumescent material is an organic/inorganic fire resistive elastomeric sheet available from 3M Company under the trade designation 3M FIRE BARRIER FS-195+ WRAP/STRIP. A preferred commercially available intumescent material is a flexible intumescent strip available from 3M Company under the trade designation E FIS.

The article 2 in FIG. 2 is shown with the non-woven web of insulating material 14 sandwiched between layers of intumescent material 12, 16. Other constructions, however, are possible. For example, the intumescent material 12, 16 may completely surround the fibrous insulating material 14. Forming the article to include intumescent material on the outer surface allows the intumescent material to expand and make contact with intumescent material from an adjacent article in the event of a fire. Because the expanded intumescent material is adhesive, the articles combine to form a structural barrier that prevents fire and smoke from passing through the opening, and further provides a barrier with sufficient mechanical integrity to pass the hose stream component of ASTM E814 without the use of secondary support structures or reinforcement. Alternatively, the insulation material 14 may be omitted from the construction.

By providing the firestop article 2 with an attachment surface 8, the firestop article 2 of the present invention has the ability to be used to firestop openings in walls, floors, and ceilings without the need for secondary reinforcement, thereby reducing installation time, facilitating re-entry into the opening, reducing cost, decreasing the complexity of the installation, and simplifying job-site logistics.

Another desirable feature of the present invention is that upon exposure to high temperatures such as those encountered a fire or fire-like conditions, it develops cohesive strength and adhesive properties that allow passage of the hose stream component of ASTM E814 without the need for secondary reinforcement. The need for secondary reinforcement is a prominent undesirable feature of firestop systems constructed from materials commercially available.

Because firestop barriers are often re-entered, it is preferred that the outer surfaces of the enclosures not adhere at ambient temperatures. If the enclosures form adhesive bonds at ambient temperatures, the articles may be damaged during re-entry, therefore making re-entry difficult, costly, and time consuming. Thus, the articles according to the present invention only develop adhesive/cohesive properties after being exposed to relatively high temperatures such as those encountered in a fire or in fire-like conditions, and may be readily separated prior to being exposed to such temperatures. The bond formation temperature can be controlled by choosing outer layers of intumescent material that are not adhesive/cohesive at ambient temperatures or by including outer layers (e.g. polyethylene film) on the outer surfaces of the intumescent material. As noted previously, the outer layers may be provided by enclosing the intumescent material in a sealed bag, that preferably conforms to the shape of the firestop material.

Firestop materials are generally at least partially ablative so as a fire progresses the materials near the hot side lose their effectiveness. Consequently, both the non-woven fibrous interior material and the intumescent material ablate and lose their effectiveness. This has the effect of destroying the cohesive strength and/or adhesive bonds.

Two approaches may be used to ensure an effective bond between adjacent articles. First, the bonds may form at a relatively low activation temperatures and thereby cover a large fraction of the interface in excess of which will ablate during a fire. Alternatively, a bond region at or near the hot side may form and gradually move towards the cold side as the cohesive/adhesive component gradually ablates and the bond is destroyed. Generally, the progression of the bond line through the intumescent material will be faster than the progression of the sintering line through the non-woven fibrous web. It is desirable that the cohesive/adhesive component forms a char, thereby protecting the bond and slowing the ablation of the article. The char may occupy the same location as the bond.

The composition of the intumescent material preferably includes a high proportion of a thermoplastic polymer which may be either uncross-linked, or cross-linked to a small degree. Thermoplastic polymers are preferred because they typically undergo viscous flow at temperatures present in fires. The flow of the material allows the material to penetrate the non-woven fibrous insulating material and form a bond therewith. The flow of most thermoplastic polymers, however, is too great under fire-like conditions. The viscous flow properties of the thermoplastic polymer may be modified, however, by adding fillers and cross-linking the thermoplastic polymer. Furthermore, appropriate fillers, such as aluminum trihydroxide (ATH), also impart fire resistive properties to the composition. Suitable polymers include polychloroprene, fluoropolymers, EVA, and acrylics. Polymers which are inherently fire retardant are especially well suited for this application.

Intumescent systems of the present invention have an intermediate level of expansion. If the expansion is too great, it may destroy the wall (or floor), or be forced out of the through-penetration and thereby fail. In addition, intumescent firestop materials generally become more friable during and after expansion. With increasing expansion and the corresponding decrease in density, a point is reached where the material's integrity is too low to pass the ASTM E814 hose stream test.

Figure 3:
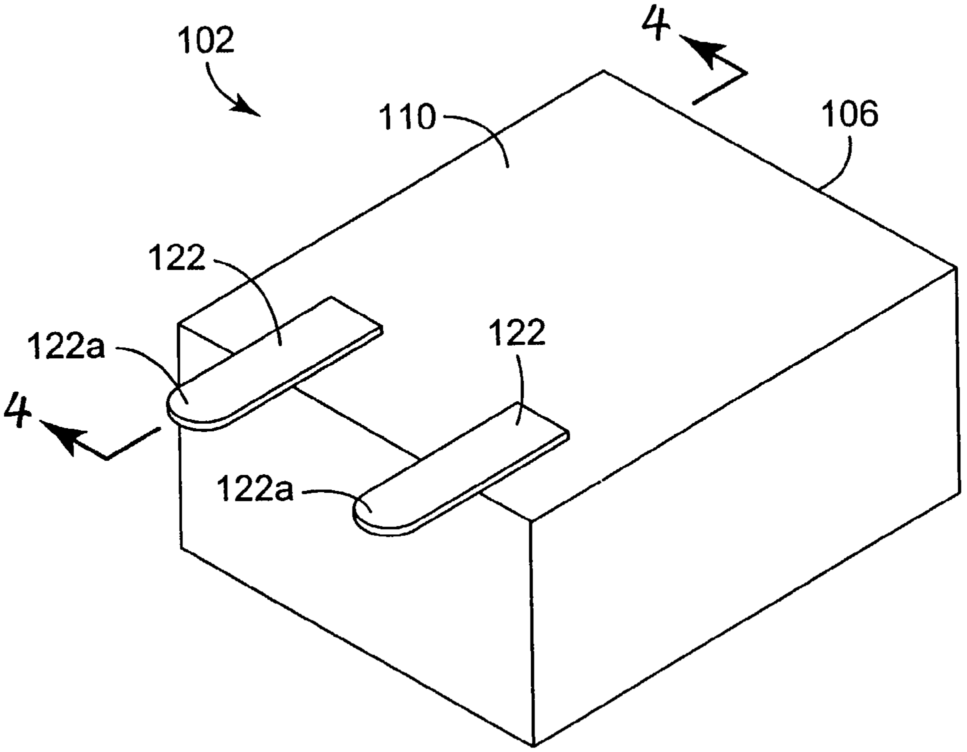
FIG. 3 is a perspective view of a second embodiment of the invention.
Figure 4:
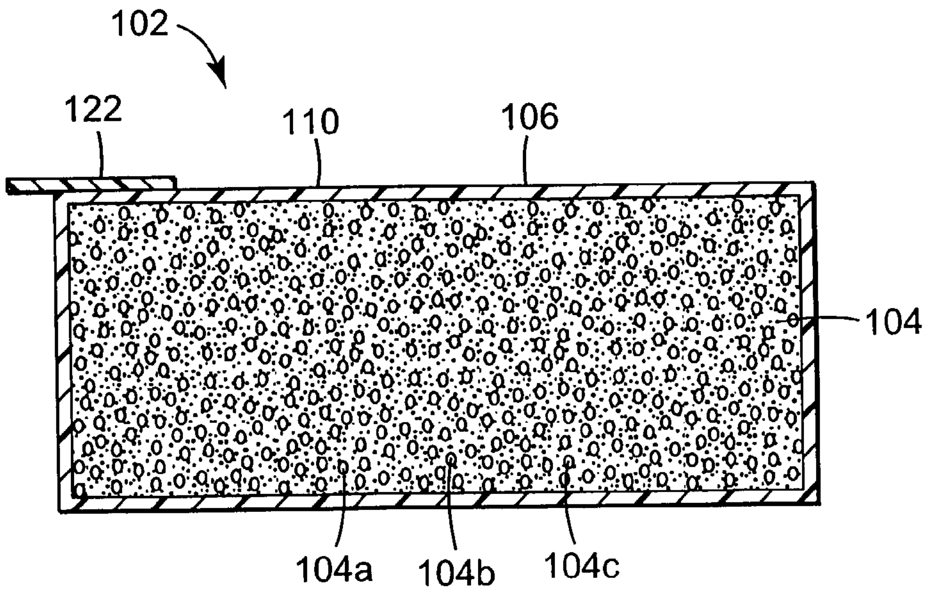
FIG. 4 is a cross-sectional view taken along line 4-4 of FIG. 3.

Referring now to FIGS. 3 and 4, there is shown a second firestop article 102 according to the invention including firestop filler material 104 contained within an enclosure 106. Stretch releasing adhesive strips 122 are provided on the outer surface 110 of one side of the article 102 to allow the article to be removably secured within an opening in a wall, floor, or ceiling, and to be affixed to other adjacent articles arranged in the opening. The number and location of the adhesive strips 122 may be adjusted depending on the particular needs of an installation site.

Stretch release adhesives are adhesives that can be adhered firmly to a substrate and thereafter cleanly removed by stretching. Suitable stretch releasing adhesive tapes may include an elastic backing, a highly extensible and substantially inelastic backing, or can be a tape formed of a solid, elastic pressure sensitive adhesive. Suitable stretch releasing tapes are described in U.S. Pat. No. 4,024,312 (Korpman), German Patent No. 33 31 016, U.S. Pat. No. 5,516,581 (Kreckel et al.), and U.S. Pat. No. 6,231,962 (Bries et al). In addition, the stretch releasing adhesive tape can include a splittable layer such as the layers described in U.S. Pat. No. 6,004,642 (Langford), or a re-fastenable layer such as the layers described in PCT International Publication No. WO 99/31193. Commercial stretch releasing adhesive tapes include the product sold under the trade designation COMMAND by 3M, St. Paul, Minn., and the product sold under the trade designation POWER-STRIPS by tesa AG, Hamburg, Germany. These products are currently manufactured as discrete strips with one end of the strip including a non-adhesive pull tab to facilitate stretching of the strip during removal. The adhesive surfaces of the strip may additionally be protected with a release liner (not shown).

To facilitate installation of the article 102, the stretch releasing adhesive strips may be initially provided with a release liner covering the adhesive surface of the stretch release adhesive strip. The release liner is preferably folded back onto itself in overlapping relation so that the stretch release adhesive strip liner can be removed from its respective surface in reverse peal by pulling on a free end of the release liner while the article remains in a fixed position within the opening. In this manner, the release liner allows the article to be easily slid into position within the opening and, once the article has been placed at the desired location, the release liners can be removed to adhesively bond the articles to an adjacent article or to the opening itself.

Alternatively, the stretch releasing adhesive strips 122 can be replaced with a temporary, repositionable or readily removable adhesive, such as the Post-It Note brand adhesive available from the 3M Company, St. Paul, Minn. By providing the articles with repositionable adhesive, the articles may be securely arranged in the opening but may also be repeatably attached and detached or replaced without damaging the articles.

The enclosure 106 may be formed from a variety of materials including paper, plastic, and woven and nonwoven fabrics as described above with respect to FIGS. 1 and 2, or from a flexible conformable fire resistant material. Suitable fire resistant materials include 3M FIRE BARRIER FS-195+ intumescent strip, INTERAM G-MAT intumescent sheet, or 3M NEXTEL AF-10 woven fabric, all available from 3M Company, St. Paul, Minn. A preferred fire resistant material is INTERAM G-MAT laminated on both sides with a fire retardant polyester cover web such as REEMAY Spunbond web #2016, respectively, available from Snow Filtration, Westchester, Ohio.

The firestop filler material 104 may comprise a mixture of intumescent material, insulating material, and endothermic material. Alternately, the firestop filler material may be a moldable intumescent putty.

In the design of the firestop article of the present invention, it is often desirable to include an infrared radiation blocking layer. In a fire, a large proportion of the heat transferred to and across a firestop originates as infrared radiation. Thus, a firestop which blocks infrared radiation will minimize heat transfer which must otherwise be retarded by insulation, endothermic absorption, or other means.

Thus, to reduce the quantity of heat transferred across the through-penetration and thereby improve the fire stopping characteristics of the article 102, the enclosure 106 may optionally include a sheet of infrared radiation blocking material (not shown) arranged adjacent either the inner or outer surface of the enclosure 106.

Suitable infrared radiation blocking materials include metal foils. A preferred infrared radiation blocking material is NEXTEL FLAME STOPPING DOT PAPER available from 3M Company, St. Paul, Minn. This material and other vitreous materials reflect a large portion of radiation in the infrared spectrum and are thus useful as infrared radiation blockers. Certain examples have the further advantage of melting points above those temperatures found in most fires. Furthermore, their flexibility/drapability is higher than many metal foils.

The enclosure 106 may further include a sheet of endothermic material arranged adjacent the infrared radiation blocking material. It will be recognized that the position of the sheet of endothermic material may be switched with the position of the infrared radiation blocking material.

Suitable endothermic compounds include compounds which thermally decompose, typically with the evolution of one or more small molecules such as ammonia, carbon dioxide, and/or water, which volatilize, or which react with one or more other compounds present within the fire barrier material or the surrounding atmosphere in a manner which provides a net uptake of thermal energy by the system. In cases involving small molecule evolution or substantial volatilization of a constituent of the endothermic compound, some heat may be carried away from the fire barrier material and the items to be protected by the fire barrier material. Solid endothermic compounds may provide separate contributions from each of heat of fusion, heat capacity, heat of vaporization, and thermal energy lost as hot gas leaves the fire barrier material. Preferably, any volatile gas produced by the endothermic compound is not combustible.

Suitable endothermic compounds include inorganic materials which provide endothermic reaction or phase change without exothermic decomposition or combustion between 194 and 2732° F. (90 and 1500° C.). Exemplary compounds include aluminum trihydrate (ATH), $Al(OH)_3$ hydrated zinc borate ($ZnB_2O_4.6H_2O$), calcium sulfate ($CaSO_4.2H_2O$) also known as gypsum, magnesium ammonium phosphate ($MgNH_4PO_4.6H_2O$), magnesium hydroxide ($Mg(OH)_2$), and encapsulated $H_2O$. Preferred endothermic agents include magnesium ammonium phosphate hexahydrate, $MgO.2B_2O_3.9H_2O$, gypsum, and $MgHPO_4.3H_2O$.

The firestop filler material 104 comprises a plurality of discrete particles 104*a*, 104*b*, 104*c*. The intumescent filler material includes an intumescent compound and may, alternatively, include an insulating material, an endothermic compound, and mixtures thereof. An intumescent compound is one that expands to at least about 1.5 times its original volume upon heating. The quantity and type of intumescent compound used in the article 102 will depend on the particular end use application, the size of the through-penetration to be fire stopped, and the size of the article 102.

Exemplary intumescent compounds include intumescent graphite such as intercalated graphite and acid treated graphite, hydrated alkali metal silicates, vermiculite, perlite, NaBSi, volcanic glass with $CO_2$ blowing agent incorporated within the glass particles, mica, and mixtures thereof. The intumescent compound is preferably in the form of discrete particles which may be formed, for example, by chopping a sheet of intumescent material into smaller pieces.

Suitable intumescent graphite materials include acid intercalated graphite commercially available under the trade name GRAFGUARD 160 and GRAFGUARD 220, both from UCAR Carbon of Cleveland, Ohio. Another suitable intumescent agent is a granular hydrated alkali metal silicate intumescent composition commercially available under the trade designation EXPANTROL 4BW PLUS from the 3M Company St. Paul, Minn. or chopped INTERAM ULTRA GS intumescent and endothermic compound also available from 3M Company.

Granular hydrated alkali metal silicate intumescent compound commercially available from 3M Company, St. Paul, Minn., under the trade designation EXPANTROL 4BW PLUS is very dense and has good intumescent properties. Intumescent graphite has excellent intumescent properties and relatively low density compared with EXPANTROL 4BW PLUS and INTERAM ULTRA GS.

Additional intumescent compounds are described in U.S. Pat. No. 5,869,010 (Langer), U.S. Pat. No. 5,476,891 (Welna), U.S. Pat. No. 5,830,319 (Landin), U.S. Pat. No. 5,523,059 (Langer) U.S. Pat. No. 6,153,674 (Landin), and U.S. Pat. No. 6,153,668 (Gestner et al.).

It is noted that while it is desirable to include an enclosure 106, the enclosure 106 is not necessary. Accordingly, the stretch releasing adhesive strips 122 may be affixed directly to the firestop filler material 104.

By providing stretch releasing adhesive strips 122 on the outer surface 110 on at least one major face of the article 102 with the non-adhesive pull tab 122*a* extending outwardly from the opening so as to be accessible to a user who later wishes to remove the strip, the articles 102 can be secured in place within an opening in a wall, floor, or ceiling during installation and held in place during use, and when cables, or other items need to be added to the opening, selected articles can be easily removed by stretch releasing the associated stretch releasing adhesive strip(s) via the exposed non-adhesive pull tab, thereby releasing the corresponding article(s). When the work of adding or removing items from the opening has been completed, new stretch releasing adhesive strips are used to secure the articles, which had been previously removed, in place, again with the non-adhesive pull tabs extending outwardly from the opening to be accessible for future stretch release.

The patents, patent documents, and patent applications cited herein are incorporated by reference in their entirety as if each were individually incorporated by reference. It will be apparent to those of ordinary skill in the art that various changes and modifications may be made without deviating from the inventive concept set forth above. For example, it will be recognized that the firestop article of the present invention can be made is various shapes such as cubes, cylinders, spheres, or irregular shapes. In addition, the attachment surface can be provided in various patterns and in varying degrees of coverage depending on the specific end use application and/or shape of the article. And the attachment surface shown in FIGS. 1 and 2 may be used with the article shown in FIGS. 3 and 4. Likewise, the stretch releasing adhesive strips shown in FIGS. 3 and 4 may be used with the article shown in FIGS. 1 and 2. Thus, the scope of the present invention should not be limited to the structures described in this application, but only by the structures described by the language of the claims and the equivalents of those structures.

What is claimed is:

1. A firestop article for insertion into an opening in a partition for fire stopping the opening, comprising:

(a) a firestop material defining a periphery;

(b) an enclosure disposed around said periphery of said firestop material; and (c) an attachment surface comprising attachment material selected from the group consisting of a refastenable mechanical fastener, a stretch release adhesive, a contact responsive fastener, and a repositionable adhesive coupled to an exterior of said enclosure, wherein said firestop article is configured to be inserted into the opening such that upon final assembly within the opening, said attachment surface is arranged to allow said firestop article to be repeatably attached to, removed from, and reattached to an attachment surface of at least one adjacent firestop article within the opening.

2. A firestop article as defined in claim 1, wherein said enclosure encompasses an entirety of said firestop material.

3. A firestop article as defined in claim 1, wherein said enclosure permanently separates said attachment surface from said firestop material.

4. A firestop article as defined in claim 3, wherein said attachment surface is a band comprising at least one of hook and loop fasteners, said band encircling said firestop material.

5. A firestop article as defined in claim 1, wherein said enclosure is a sealed bag.

6. A firestop article as defined in claim 1, wherein said firestop material is sealed within said enclosure.

7. A firestop article for insertion into an opening in a partition for fire stopping the opening, comprising:

(a) firestop material having an outer surface; and (b) an attachment surface comprising attachment material selected from the group consisting of a refastenable mechanical fastener, a stretch release adhesive, a contact responsive fastener, and a repositionable adhesive, said attachment material being arranged on said firestop material outer surface;

wherein said firestop article is configured to be inserted into the opening such that upon final assembly within the opening, said attachment surface is exposed relative to said firestop material to allow said firestop article to be repeatably attached to, removed from, and reattached to a separate attachment surface apart from said firestop article, and wherein said firestop material comprises non-woven fibrous interior insulating material and an intumescent material arranged around at least a portion of said insulating material.

* * * * *

UNITED STATES PATENT AND TRADEMARK OFFICE

CERTIFICATE OF CORRECTION

PATENT NO. : 8,097,310 B2
APPLICATION NO. : 10/360087
DATED : January 17, 2012
INVENTOR(S) : Stephen Allen Miller It is certified that error appears in the above-identified patent and that said Letters Patent is hereby corrected as shown below:

IN THE SPECIFICATIONS:

Column 4
Line 21, delete “VELCOR” and insert -- VELCRO --, therefor.

Column 4
Line 40, delete “Pat” and insert -- Pat. --, therefor.

Column 6
Line 22, delete “shrink-age” and insert -- shrinkage --, therefor.

Signed and Sealed this
First Day of May, 2012

David J. Kappos
*Director of the United States Patent and Trademark Office*